UNITED STATES PATENT OFFICE.

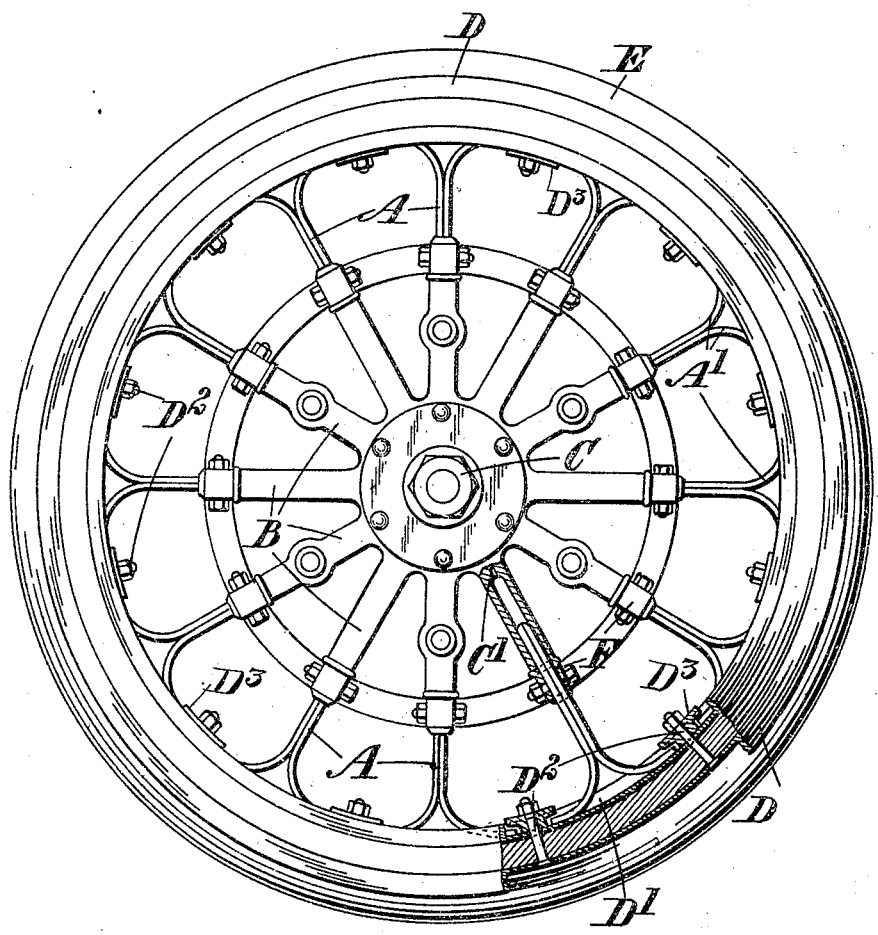

DIGBY CHESTER MASTER, OF HELOUAN, NEAR CAIRO, EGYPT.

SPRING-WHEEL FOR VEHICLES.

No. 802,009.     Specification of Letters Patent.     Patented Oct. 17, 1905.

Application filed February 9, 1905. Serial No. 244,935.

*To all whom it may concern:*

Be it known that I, DIGBY CHESTER MASTER, a subject of the King of England, residing at Helouan, near Cairo, Egypt, have invented a certain new and useful Improved Spring-Wheel for Vehicles, of which the following is a specification.

This invention relates to improvements in spring-wheels for vehicles, and the wheel is primarily designed to obviate the necessity for the use of pneumatic tires and the consequent delays and inconvenience caused by punctures and valve nuisances.

According to this invention sleeves or tubes radiate from the hub of the wheel and flexible spring-spokes bent at the outer ends and engaging the rim are placed back to back in pairs at the inner ends, which fit into the sleeves. Preferably the rim is channeled on its inner face, and the spokes may be formed by flexible spring-bands bent at the outer end, which engage the channel and can move slightly therein and placed back to back in pairs at the inner ends, which fit into the sleeves. The pairs of spokes may be provided with adjustable clamps or with bolts, which by rigidly connecting the pairs of spokes at different points may serve to regulate the resilience of the wheel.

The accompanying drawing is an elevation of a wheel constructed in accordance with this invention, partly broken away for greater clearness.

The spokes A are made of flat flexible spring-steel, each bent at the outer end A'. The inner ends of contiguous spokes are placed back to back and fitted into tubes or sleeves B, radiating from the hub C of the wheel. The outer end or bow A' of each spring is fitted into a trough or channel D' in the rim D of the wheel and fixed therein by bolts $D^2$, holding-stops $D^3$, rivets, or the like means to prevent risk of the springs being jerked out of position. The rim D of the wheel may be formed of H or channel steel or iron or of any other suitable material and shape and may be fitted with solid india-rubber tires E or not, according to the kind of vehicle to which the wheel is fitted. The hub of the wheel may be fitted with means of lubrication, such as the passage C'.

When loaded, the hub of the wheel is borne downward, the spring-spokes vertically below the same are pressed down, and the free or outer ends A' bent outward in the channel. The spring-spokes vertically above the hub are pulled downward and inward away from the rim, and the action of the load upon the other spring-spokes is intermediate, according to their several positions.

The spring-spokes are preferably fixed in the sleeve; but may, if desired, slide therein to some slight extent. A little clearance is allowed between the outer ends of the spokes A' and the stops $D^3$, held by the bolts $D^2$, so that as the wheel yields the outer end of the spoke moves slightly in the channel.

The spokes between the ends of the sleeves and the rim of the wheel may be fitted with clips or clamps F, attached with set-screws, and these clamps may be moved either toward the rim or in the direction of the end of the sleeve, according as more or less resilience is required.

The sleeves of the spokes may be either round, square, or polygonal, and brake-brackets or sprocket-wheels for driving may be attached to these radiating sleeves. A steel or other metal band may be used to connect the ends of the sleeves where the steel springs are inserted into them, and this arrangement may be particularly convenient if the sleeves are made of wood.

According to the nature of the vehicle to which the wheel is to be applied the materials used, the weight of the parts, the number of spokes, and other details of construction may be varied.

What I claim as my invention, and desire to secure by Letters Patent, is—

1. In a spring-wheel for a vehicle the combination of a hub, a number of sleeves radiating from the hub, a rim, and flexible spring-spokes bent at the outer end which can move slightly in the rim and placed back to back in pairs at the inner ends which fit into the sleeves.

2. In a spring-wheel for a vehicle the combination of a hub, a number of sleeves radiating from the hub, a rim, flexible spring-spokes bent at the outer ends which engage with the rim and placed back to back in pairs at the inner ends which fit into the sleeves and means for retaining the outer ends of the spring-spokes on the rim and allowing the ends to move slightly on the rim.

3. In a spring-wheel for a vehicle the combination of a hub, a number of sleeves radiating from the hub, a rim, flexible spring-spokes bent at the outer ends which engage with the rim and placed back to back in pairs at the inner ends which fit into the sleeves and means for retaining the outer ends of the spring-spokes on the rim and allowing the ends to move slightly on the rim, and adjustable means for regulating the resilience of the wheel.

4. In a spring-wheel for a vehicle the combination of a hub, a number of sleeves radiating from the hub, means for supporting the outer ends of the sleeves, a rim, flexible spring-spokes bent at the outer ends which engage with the rim and placed back to back in pairs at the inner ends which fit into the sleeves, means for retaining the outer ends of the spring-spokes on the rim and allowing the ends to move slightly on the rim, and adjustable means for regulating the resilience of the wheel.

5. In a spring-wheel for a vehicle the combination of a hub, a number of sleeves radiating from the hub, a rim having a channel on its inner face, flexible spring-steel spokes bent at the outer ends which engage the channel and placed back to back in pairs at the inner ends which fit into the sleeves.

6. In a spring-wheel for a vehicle the combination of a hub, a number of sleeves radiating from the hub, a rim having a channel on its inner face, and flexible spring-steel spokes each bent at the outer ends which can move slightly in the channel and placed back to back in pairs at the inner ends which fit into the sleeves.

7. In a spring-wheel for a vehicle the combination of a hub, a number of sleeves radiating from the hub, a rim having a channel on its inner face, flexible spring-steel bands each bent at the outer ends which engage the channel and placed back to back in pairs at the inner ends which fit into the sleeves, and bolts passing through the rim to retain the outer ends of the spring-spokes in the channel and to allow them to move slightly therein.

8. In a spring-wheel for a vehicle the combination of a hub, a number of sleeves radiating from the hub, a rim having a channel on its inner face, flexible spring-steel bands each bent at the outer ends which engage the channel and placed back to back in pairs at the inner ends which fit into the sleeves, and bolts passing through the rim to retain the outer ends of the spring-spokes in the channel and to allow them to move slightly therein; and an adjustable regulating-clamp on each pair of spokes between the sleeve and the rim.

9. In a spring-wheel for a vehicle the combination of a hub, a number of sleeves radiating from the hub, a strengthening metal band connecting the outer ends of the sleeves, a rim having a channel on its inner face, flexible spring-steel bands each bent at the outer ends which engage the channel and placed back to back in pairs at the inner ends which fit into the sleeves, bolts passing through the rim to retain the outer ends of the spring-spokes in the channel and to allow them to move slightly therein and an adjustable regulating-clamp on each pair of spokes between the sleeve and the rim.

In testimony whereof I have signed my name to this specification in the presence of two subscribing witnesses.

DIGBY CHESTER MASTER.

Witnesses:
 H. OVERTON HOBSON,
 GOOPE M. MASTER.